United States Patent Office 3,441,569
Patented Apr. 29, 1969

3,441,569
METHOD FOR PREPARING POLYCYCLIC HETEROCYCLIC COMPOUNDS
Charles W. Hargis, Johnson City, and Howard S. Young, Kingsport, Tenn., assignors to Eastman Kodak Company, Rochester, N.Y., a corporation of New Jersey
No Drawing. Filed May 31, 1966, Ser. No. 553,630
Int. Cl. C07d 27/56, 27/00, 63/00
U.S. Cl. 260—319.1                15 Claims

ABSTRACT OF THE DISCLOSURE

Method of preparing an arylheterocyclic compound comprising contacting, at an elevated temperature, a compound of the formula:

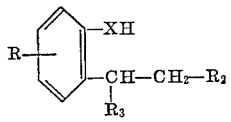

wherein R is hydrogen, lower alkyl or phenyl; $R_2$ and $R_3$ are hydrogen or the same or different lower alkyl group; and X is NH, O, S or the group $>N-R_1$ wherein $R_1$ is lower alkyl with a contact agent selected from the group consisting of an arsenic, antimony, or bismuth oxide, an arsenic, antimony, or bismuth sulfide, and an arsenic, antimony, or bismuth salt. The products are useful in the manufacture of dyes, pharmaceuticals, cosmetics, perfumes and plant growth regulators.

---

This invention relates to novel chemical reactions. More particularly, this invention is concerned with the use of contact agents to produce polycyclic heterocyclic compounds by dehydrocyclization of aromatic compounds.

It has been found according to the present invention that arsenic, antimony or bismuth oxides, sulfides or other suitable salts of these metals, are suitable oxidative dehydrocyclization contact agents which can effect the conversion of ortho-alkyl derivatives of aromatic amines, phenols and thiophenols to polycyclic heterocyclic compounds.

More specifically, the present invention provides a method of producing arylheterocyclic compounds which comprises contacting a compound of the formula

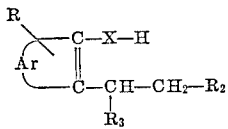

preferably in the vapor phase, with an arsenic, antimony or bismuth oxide, sulfide or other salt of such metals, or mixtures thereof, at an elevated temperature of about 250° C. to about 700° C. to produce a compound of the formula

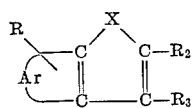

wherein

represents an aryl group such as phenyl or naphthyl, R is hydrogen, a lower alkyl such as methyl, ethyl and propyl, or phenyl and $R_2$ and $R_3$ are hydrogen or the same or different alkyls such as methyl, ethyl and propyl and X is NH, O or S or the group $>N-R_1$ wherein $R_1$ is a lower alkyl such as methyl, ethyl and propyl.

The contact agents can be employed in any of the several oxidative states, or levels, of arsenic, antimony and bismuth oxides, sulfides and salts. Representative of these oxides and sulfides which can be used are $As_2S_2$, $As_2S_3$, $As_2S_5$, $As_2O_3$, $As_2O_5$, $Sb_2S_3$, $Sb_2S_5$, $Sb_2O_3$, $Sb_2O_4$, $Sb_2O_5$, $Bi_2S_3$, $Bi_2O_3$, and $Bi_2O_5$ and mixtures of these oxides and sulfides and other salts of arsenic, antimony and bismuth which have an oxidative action under the conditions of reaction. Representative of the salts that can be used are calcium arsenate, potassium pyroantimonate and sodium bismuthate.

The contact agents can be obtained commercially, or they can be prepared by oxidation of free arsenic, antimony or bismuth metal or a mixture of the free metals taken in any desired proportion. Also, intermediate or lower oxides or sulfides of the metals can be formed by decomposition or reduction of higher oxides or sulfides or mixtures thereof according to conventional procedures. In addition, intermediate oxides can be formed by oxidation in air of the corresponding metal lower oxides. Sulfides can be obtained by treatment of the oxides with hydrogen sulfide or other known methods.

To obtain increased contact with the reactants, and greater ease of reaction, it is often advantageous to support the arsenic, antimony and/or bismuth oxide or sulfide or other salt thereof, or mixtures thereof, on a support medium such as silica or alumina.

Included among the ortho-alkyl derivatives of aromatic amines, phenols and thiophenols which can be used in the process are o-ethylaniline, o-ethylphenol, o-ethylthiophenol, o-n-propylaniline, o-isopropylaniline, o-isopropylthiophenol, o-isopropylphenol, N-methyl-o-ethylaniline, 2,6-diethylaniline, o-n-propylthiophenol, 1-amino-2-ethylnaphthalene, 2-amino-3-ethylnaphthalene, 3-ethylthio-2-naphthol, 2-ethylthio-1-naphthol, 2-ethyl-1-naphthol and 3-ethyl-2-naphthol.

The reactant can be brought into contact with the contact agent by any suitable means. One suitable way of carrying out the contacting in the vapor phase is to heat the orthoalkyl derivative of an aromatic amine, phenol or thiophenol to the vapor state and then pass it through a reactor containing the contact agent in the form of a vapor penetrating mass. A tube of metal, glass or ceramic material forms a suitable reactor.

Although the reactor can be maintained at from about 250° C. to about 700° C. to effect the oxidative dehydrocyclization, a contact temperature of about 300° C. to 650° C. is usually more suitable. The contact time of the gaseous or vapor feed when the reaction is carried out in the vapor phase is advisably adjusted to range from about 0.1 sec. to 100 sec., and most suitably about 0.5 sec. to 75 sec. The contact time is the time required for the feed gas to fill an empty volume equal to the bulk volume of the contact agent bed, calculated for operating conditions assuming the perfect gas law applies and no chemical reaction takes place. It is to be understood that the operating conditions required will vary with the contact agent used, the reactant feed and the particular equipment employed. These and other factors are readily adjusted in arriving at suitable specific conditions.

When desired, diluents such as nitrogen, steam or hydrocarbons such as benzene can be included in the reactor feed to facilitate removal of products from the reaction zone and as a means of moderating the reaction. This can be of special importance when the contact agent is fresh and in a highly reactive state. The use of a diluent also can have the effect of broadening the range of safe operation, particularly when a gaseous oxidant, such as air, is included in the gaseous feed stream.

The reaction can be effected at atmospheric pressure or under any desired pressure whether higher or lower than atmospheric pressure.

The reaction can be effected in the presence or absence of an added oxidant in the feed stream. In the absence of an added oxidant, direct chemical reaction takes place between the contact agent and the organic compound to produce (1) an oxide or sulfide or other salt in which the metal has a lower valence than in the starting oxide or sulfide, or even to free metallic arsenic, antimony or bismuth, (2) the dehydrocyclization product, and (3) water or hydrogen sulfide when an oxide or sulfide is used. The oxygen or sulfur made available by the contact mass serves as a hydrogen acceptor for shifting the reaction equilibrium in favor of forming the desired end product. In the absence of an added gaseous oxidant, the productivity of the contact agent declines as its oxygen or sulfur content declines. The depleted or partially depleted contact agent can then be regenerated by conventional methods and used again in the process.

By including an oxidant such as oxygen or oxygen-containing mixtures in the gaseous feed when $Sb_2O_4$ or $Bi_2O_3$ are employed as contact agents, a continuous reaction is achieved. The addition of a gaseous oxidant tends, at the conditions under which the reaction is carried out, to restore or maintain the starting oxidation state of the arsenic, antimony or bismuth oxide thereby promoting continuity of reaction. While oxidant concentrations in the feed gas can be varied over wide limits, reaction variables such as temperature, contact time and partial pressures of the feed components are to be adjusted to minimize undesirable consumption of the feed stock and end product.

The reaction product can be collected as by condensation and the polycyclic heterocycle isolated from unchanged feed stock and by-products by any of several conventional methods such as by distillation. Unchanged starting feed may be recycled for making additional product. Small amounts of by-products such as o-vinylaniline, indoline, ethylbenzene and ammonia may be present in the crude product obtained from, for example, o-ethylaniline. These may be removed during product purification or effectively recycled since they can lead to formation of more of the desired end product. For example, recycling of small amounts of ammonia may aid in suppressing the deamination of the starting aniline. Corresponding by-products can be expected from phenol and thiophenol feed stocks.

Among the products which can be produced, following the described conditions and using the appropriate starting reactant, are indole, N-methylindole, 2-methylindole, 3-methylindole, benzofuran, 2-methylbenzofuran, thianaphthene, 7-ethylindole, alpha-naphthindole, beta-naphthindole, naphthol [2,3 - b]thiophene, naphtho[1,2-b]thiophene, naphtho[1,2 - b]furan and naphtho[2,3-b]furan. These and other products of the reaction have wide uses in the manufacture of dyes, pharmaceuticals, cosmetics, perfumes and plant growth regulators.

The following examples are presented to further illustrate, but not limit, the invention.

EXAMPLE 1

During a period of 60 min., 16.7 g. (0.138 mole) of o-ethylaniline is fed to 50 ml. of granular $Sb_2O_4$ heated to a temperature of 510° C. The reaction is carried out in two 30-min. cycles with regeneration of the oxide by heating in air at 510° C. between cycles. Substantial reduction of the oxide occurs by the end of each 30-min. cycle as determined by change in oxidant color and by decreased activity of the oxidant as shown by gas-liquid chromatographic analysis of product samples taken initially and near the end of each 30-min. cycle. The combined liquid reactor effluent, a two-phase organic-aqueous product, is collected in receivers cooled to 10° C. and —80° C., respectively. Analysis of the organic product shows 5.8 g. (0.049 mole) of indole and 7.6 g. (0.063 mole) of unchanged o-ethylaniline. The conversion of o-ethylaniline to indole is 35.5%, and the yield of indole based on o-ethylaniline consumed is 65.4%. The space-time yield of indole, ignoring the time spent in reoxidizing the reduced oxidant, is 116. Space-time yield is the grams of indole produced per liter of oxidant per hour.

EXAMPLE 2

During a period of 35 min., 15 g. (0.124 mole) of o-ethylaniline and 3185 ml. of air at standard temperature and pressure are fed to the tubular reactor of Example 1 containing 50 ml. of granular $Sb_2O_4$ heated to a temperature of 510° C. The retention of a yellow coloration in the contact mass and its high level of activity near the end of the run indicate a sustained oxidation level of the contact agent oxidant during the dehydrocyclization reaction due to the addition of gaseous oxidant. Analysis of the organic phase of the two-phase liquid product collected as in Example 1 shows 4.0 g. (0.034 mole) of indole and 8.9 g. (0.073 mole) of unchanged o-ethylaniline. The conversion to and yield of indole amounts to 27.4% and 66.7%, respectively. The space-time yield of indole is 137. The higher space-time yield obtained in this run as compared to that obtained in Example 1 is also indicative of the catalytic influence of added gaseous oxidant.

EXAMPLE 3

The sample of antimony oxide used in Example 1 is reoxidized by heating in air at 510° C. During a period of 60 min., 9.7 g. (0.080 mole) of o-ethylaniline is fed to the regenerated oxide heated to a temperature of 510° C. in the tubular reactor of Example 1. The reaction is carried out in two 30-min. cycles with regeneration of the oxide between cycles by heating in air at 510° C. Collection of the two-phase liquid product as in Example 1 and analysis shows 4.6 g. (0.039 mole) of indole and 3.4 g. (0.028 mole) of unchanged o-ethylaniline. The conversion and yield, as expressed in Example 1, amount to 48.8% and 75.0%, respectively. The space-time yield of indole, expressed as in Example 1, is 92.

EXAMPLE 4

During a period of 30 min., 14.7 g. of o-ethylaniline is fed to 50 ml. of granular $As_2O_5$ heated to a temperature of 420° C. in the tubular reactor of Example 1. Collection of the two-phase liquid product, filtration to remove $As_2O_3$ resulting from reduction of $As_2O_5$, and analysis of the organic phase by gas-liquid chromatography shows the presence of indole.

EXAMPLE 5

During a period of 30 min., 24.4 g. of o-ethylphenol is fed to 100 ml. of granular $Bi_2O_3$ heated to a temperature of 500° C. in a 1.5-in. outside diameter tubular glass reactor. Collection of the two-phase liquid product and gas-liquid chromatographic analysis of the organic phase shows the presence of benzofuran. Following use, the contact mass is black in appearance, indicating its partial reduction. However, on heating in air at 500° C. the contact mass granules assume the yellow-orange coloration indicative of the reoxidized state. Prolonged exposure of the $Bi_2O_3$ to the organic reducing medium in the absence of added gaseous oxidant is to be avoided to prevent complete reduction of the oxidant to the metallic state and subsequent loss of bismuth from the reaction zone.

EXAMPLE 6

During a period of 30 min., 30.0 g. of o-ethylthiophenol is fed to the Bi₂O₃ sample of Example 5 heated to 500° C. following its reoxidation by heating in air. A two-phase aqueous-organic liquid effluent is collected as before. Thianaphthene is identified in the organic reaction product by gas-liquid chromatographic analysis.

EXAMPLE 7

During a period of 30 min., 15.7 g. of o-ethylaniline is fed to a sample of granular Bi₂O₃ heated to a temperature of 500° C. in the reactor of Example 5. Collection of the two-phase liquid product as before and gas-liquid chromatographic analysis of the organic product shows the presence of indole.

EXAMPLE 8

During a period of 60 min., 11.1 g. of N-methyl-o-ethylaniline is fed to 50 ml. of granular Sb₂O₄ heated to a temperature of 510° C. in the tubular reactor of Example 1. As in Example 1 the reaction is carried out in two 30-min. cycles with regeneration of the oxidant between cycles. Collection of the two-phase liquid effluent and analysis of the organic phase by gas chromatography shows the presence of N-methylindole, skatole and indole.

EXAMPLE 9

During a period of 90 min., 14.0 g. (0.094 mole) of 2,6-diethylaniline is fed to 50 ml. of Sb₂O₄ heated to a temperature of 495° C. in the reactor of Example 1. The reaction is carried out in two 45-min. cycles with regeneration of oxidant between cycles of heating in air at reactor temperature. Collection of the two-phase liquid effluent as before and analysis shows 1.15 g. (0.0078 mole) of 2-ethyl-6-vinylaniline, 3.5 g. (0.024 mole) of 7-ethylindole and 5.1 g. (0.034 mole) of unchanged 2,6-diethylaniline. Thus, the conversion to 2-ethyl-6-vinylaniline is 8.4%, and the yield is 13.2%, while the corresponding values for production of 7-ethylindole are 25.6% and 40%, respectively. A third component, not identified, is obtained in 10.4% conversion and 16.3% yield based on an assumed molecular weight of 145 of the unidentified material. The substance disappeared from the reaction product before it could be isolated and identified, indicating the presence of a highly reactive species such as 2,6-divinylaniline.

EXAMPLE 10

A 50-ml. sample of granular Sb₂O₄ is heated at a temperature of 450° C. in the tubular reactor of Example 1 while contacted with a stream of hydrogen sulfide in order to convert it to a sulfide or sulfide mixture. When reaction is complete as indicated by the disappearance of heat of reaction, the oxidant sample is flushed with nitrogen and then contacted at 450° C. with 15.0 g. of o-ethylthiophenol during a period of 30 min. Hydrogen sulfide is evolved and a liquid effluent is collected as before. Thianaphthene is identified in the organic reaction product by gas-liquid chromatography.

EXAMPLE 11

During a period of 30 min., 15.0 g. of o-n-propylphenol is fed to 100 ml. of granular Sb₂O₄ heated to a temperature of 500° C. in the reactor of Example 5. Collection of the two-phase liquid product as before and analysis by gas-liquid chromatography show the presence of 2-methylbenzofuran.

What is claimed is:

1. Method of preparing an aryl heterocyclic compound comprising contacting a compound of the formula:

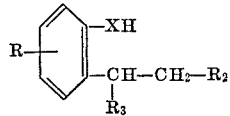

wherein R is hydrogen, lower alkyl or phenyl; R₂ and R₃ are hydrogen or the same or different lower alkyl group; and X is NH, O, S or the group >N—R₁ wherein R₁ is lower alkyl, at an elevated temperature with a contact agent selected from the group consisting of an arsenic, antimony, or bismuth oxide; an arsenic, antimony, or bismuth sulfide; calcium arsenate; potassium pyroantimonate; and sodium bismuthate.

2. The method of claim 1 in which R, R₁ and R₂ are hydrogen.

3. The method of claim 1 in which oxygen is present.

4. The method of claim 1 in which the contact agent is regenerated with oxygen or oxygen and hydrogen sulfide following a period of use.

5. The method of claim 1 in which the reactant is o-ethylaniline and the product formed is indole.

6. The method of claim 1 in which the reactant is o-ethylphenol and the product formed is benzofuran.

7. The method of claim 1 in which the reactant is o-ethylthiophenol and the product formed is thianaphthene.

8. The method of claim 1 in which the reactant is N-methyl-o-ethylaniline and the product formed is N-methylindole.

9. The method of claim 1 in which the reactant is 2,6-diethylaniline and the products formed include 7-ethylindole.

10. The method of claim 1 in which the reactant is o-n-propylphenol and the product formed is 2-methylbenzofuran.

11. The method of claim 1 in which the contact agent is an antimony oxide.

12. The method of claim 1 in which the contact agent is an arsenic oxide.

13. The method of claim 1 in which the contact agent is a bismuth oxide.

14. Method of claim 1 wherein the elevated temperature is from about 250° C. to about 700° C. and a contact time of 0.1 sec. to about 100 sec. is employed.

15. Method of claim 1 wherein the contact agent is selected from the group consisting of arsenic, antimony, or bismuth oxide and arsenic, antimony, or bismuth sulfide.

References Cited

UNITED STATES PATENTS 3,285,932  11/1966  Illingsworth et al. __ 260—319.1
2,409,676  10/1946  Gresham et al. ____ 260—319.1

FOREIGN PATENTS 684,736  4/1964  Canada.

ALEX MAZEL, Primary Examiner.

J. A. NARCAVAGE, Assistant Examiner.

U.S. Cl. X.R.

260—330.5, 346.2